(12) United States Patent
Huber et al.

(10) Patent No.: US 11,349,552 B2
(45) Date of Patent: *May 31, 2022

(54) MILLIMETER WAVE IDLE CHANNEL OPTIMIZATION

(71) Applicant: AT&T Mobility II LLC, Atlanta, GA (US)

(72) Inventors: Kurt Huber, Atlanta, GA (US); Julius Fodje, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/187,974

(22) Filed: Mar. 1, 2021

(65) Prior Publication Data

US 2021/0184754 A1   Jun. 17, 2021

Related U.S. Application Data

(63) Continuation of application No. 16/710,322, filed on Dec. 11, 2019, now Pat. No. 10,938,468.

(51) Int. Cl.
*H04B 7/10* (2017.01)
*H04B 7/08* (2006.01)
(Continued)

(52) U.S. Cl.
CPC .............. *H04B 7/086* (2013.01); *H01Q 21/24* (2013.01); *H04B 7/0814* (2013.01);
(Continued)

(58) Field of Classification Search
CPC ...... H04B 7/086; H04B 7/0882; H04B 17/21; H04B 7/0814; H04W 24/10; H01Q 21/24
(Continued)

(56) References Cited

U.S. PATENT DOCUMENTS

2018/0198510 A1   7/2018   Park
2019/0053013 A1   2/2019   Markhovsky
(Continued)

OTHER PUBLICATIONS

Giordani et al., "A Tutorial on Beam Management for 3GPP NR at mmWave Frequencies," IEEE Communications Surveys & Tutorials, vol. 21, No. 1, pp. 173-196, Nov. 4, 2019.
(Continued)

*Primary Examiner* — Don N Vo
(74) *Attorney, Agent, or Firm* — Hartman & Citrin LLC

(57) ABSTRACT

Concepts and technologies disclosed herein are directed to millimeter wave ("mmWave") idle channel optimization. According to one aspect disclosed herein, an antenna system can include an antenna array that is configured in a first antenna configuration. The antenna system can generate and send downlink beams directed towards a network edge. A beam index scanner operating at the network edge can scan the downlink beams to determine beam index scanner data for the first antenna configuration. The beam index scanner can send the bream index scanner data to an antenna technician device. The beam index scanner data can indicate that a downlink channel provided by the downlink beams is not optimized. The antenna system can configure the antenna array in a new antenna configuration in an attempt to optimize the downlink channel provided by the downlink beams.

20 Claims, 9 Drawing Sheets

(51) Int. Cl.
*H01Q 21/24* (2006.01)
*H04W 24/10* (2009.01)
*H04B 17/21* (2015.01)

(52) U.S. Cl.
CPC ........... *H04B 7/0882* (2013.01); *H04B 17/21* (2015.01); *H04W 24/10* (2013.01)

(58) Field of Classification Search
USPC .................................................. 375/267, 347
See application file for complete search history.

(56) References Cited

U.S. PATENT DOCUMENTS

2019/0260456 A1    8/2019  Zhou
2019/0319686 A1*  10/2019  Chen, IV ................ H04B 7/088
2020/0059282 A1    2/2020  Wu
2020/0154466 A1    5/2020  John Wilson
2020/0396744 A1*  12/2020  Xiong .................. H04W 56/001
2021/0314997 A1*  10/2021  Seo ....................... H04W 72/12

OTHER PUBLICATIONS

U.S. Office Action dated Jun. 22, 2020 in U.S. Appl. No. 16/710,322.
U.S. Notice of Allowance dated Oct. 14, 2020 in U.S. Appl. No. 16/710,322.
U.S. Notice of Allowance dated Nov. 27, 2020 in U.S. Appl. No. 16/710,322.
U.S. Notice of Allowance dated Dec. 10, 2020 in U.S. Appl. No. 16/710,322.

\* cited by examiner

MILLIMETER WAVE IDLE CHANNEL OPTIMIZATION

CROSS-REFERENCE TO RELATED APPLICATIONS

This application is a continuation of and claims priority to U.S. patent application Ser. No. 16/710,322, entitled "Millimeter Wave Idle Channel Optimization," filed Dec. 11, 2019, now U.S. Pat. No. 10,938,468, which is incorporated herein by reference in its entirety.

BACKGROUND

The latest 3rd Generation Partnership Project ("3GPP") specifications define multiple core connectivity options for connecting to an existing Evolved Packet Core ("EPC") used in Long-Term Evolution ("LTE") and/or a new 5G core network. Each of these options provides features with regard to the use of dual connectivity (i.e., LTE and 5G), the radio access technology ("RAT") used by the master radio access node, and the core network used. 3GPP refers to the dual connectivity options as non-standalone ("NSA") to indicate that the 5G new radio ("NR") RAT and LTE can be used simultaneously to provide radio access. 3GPP refers to single connectivity options as standalone ("SA") to indicate that either the 5G NR RAT or LTE can be used to provide radio access.

Mobile network operators ("MNOs") are expected to begin 5G deployment using an NSA option referred to as 5G Option 3, of which there are three variations, including Option 3, Option 3A, and Option 3X. All 5G Option 3 variations utilize the existing 4G core network (i.e., EPC) and existing LTE eNodeBs ("eNBs") as the signaling master node. In other words, user connection management and radio link control for the combined eNB and 5G NR gNodeB ("gNB") (i.e., eNB/gNB) is managed by the eNB portion. In 5G Option 3, data traffic is split across 4G and 5G at the eNB. In 5G Option 3A, data traffic is split across 4G and 5G at the EPC, particularly the serving gateway ("S-GW"). In 5G Option 3X, data traffic is split across 4G and 5G at the gNB. Eventually, mobile operators will transition to SA connectivity options such as 5G Option 2 in which the radio access network ("RAN") consists of only gNBs and connects to a dedicated 5G core network. 5G Option 2 is not reliant upon the 4G infrastructure.

5G utilizes the millimeter ("mm") wave ("mmWave") spectrum between 24 gigahertz ("GHz") and 100 GHz. Today, mmWave antennas are often arranged in a passive antenna array that mobile operators must tune through trial and error with energy emitted from the antenna pattern alone to achieve a suitable antenna edge. With a phased antenna array in 5G, a beam index is used that allows MNOs to scan the air/radio interface to determine through which position in the antenna pattern a signal is received. In connected mode, this information can be used to help track a mobile device (e.g., a 5G smartphone). In idle mode, however, this information can be used only as a reference for accessing a cell site when the mobile device tries to connect. The connected and connecting antenna patterns can be different in shape, numbering, and gain.

SUMMARY

Concepts and technologies disclosed herein are directed to mmWave idle channel optimization. According to one aspect disclosed herein, an antenna system can include an antenna array that is configured in a first antenna configuration. The antenna system can generate and send, via the antenna array that is configured in the first antenna configuration, downlink beams directed towards a network edge. A beam index scanner operating at the network edge can scan the downlink beams to determine beam index scanner data for the first antenna configuration. The beam index scanner can send the beam index scanner data to an antenna technician device. The beam index scanner data can indicate that a downlink channel provided by the downlink beams is not optimized. The antenna system can configure the antenna array in a new antenna configuration in an attempt to optimize the downlink channel provided by the downlink beams. The antenna system can generate and send, via the antenna array that is configured in the new antenna configuration, the downlink beams directed towards the network edge. The beam index scanner operating at the network edge can scan the downlink beams to determine new beam index scanner data for the new antenna configuration. The beam index scanner can send the new beam index scanner data to the antenna technician device. The new beam index scanner data can indicate that the downlink channel provided by the downlink beams is optimized. The state of being optimized can be established, for example, by a mobile network operator ("MNO") based upon the needs of a given implementation. The downlink beams can be transmitted by the antenna array via a millimeter wave ("mmWave") radio access technology. The network edge can be an edge of a 5G new radio ("NR") cell of a 5G radio access network.

Each antenna configuration can include an azimuth value and a tilt value associated with a position of the antenna array. For example, the first antenna configuration can include a first azimuth value and a first tilt value associated with a position of the antenna array, and the new antenna configuration can include a new azimuth value, a new tilt value, or both a new azimuth value and a new tilt value associated with a new position of the antenna array.

In some embodiments, an antenna technician device can determine that the beam index scanner data indicates that the downlink channel provided by the downlink beams is not optimized. The antenna technician device can present, via execution of an antenna technician device software, the beam index scanner data to an antenna technician. The antenna technician device can present a prompt to the antenna technician to either request a change to the first antenna configuration or accept the first antenna configuration and deny any changes to the antenna array. In these embodiments, either a request a change to the first antenna configuration or to accept the antenna technician device can be used to determine that the beam index scanner data indicates that the downlink channel provided by the downlink beams is not optimized based upon input provided by the antenna technician in response to the prompt. In some other embodiments, the antenna technician device can determine that the beam index scanner data indicates that the downlink channel provided by the downlink beams is not optimized based upon an analysis of the beam index scanner data performed by a machine learning system.

According to another aspect disclosed herein, a system can include an antenna array, a processor, and a memory. The memory can include instructions that, when executed by the processor, cause the processor to perform operations. The operations can include generating downlink beams directed towards a network edge. The operations also can include sending, via the antenna array configured in a first antenna configuration, the downlink beams towards the network edge. The operations also can include configuring the antenna array in a new antenna configuration in an attempt to optimize a downlink channel provided by the downlink beams.

In some embodiments, the system can include a combined eNB/gNB that includes the antenna array, the processor, and the memory. The system also can include a beam index scanner operating at the network edge. The beam index scanner can perform operations, including scanning the downlink beams to determine the beam index scanner data for the first antenna configuration, and sending the beam index scanner data to an antenna technician device. The instructions that, when executed by the processor, can cause the processor to perform further operations, including sending, via the antenna array configured in the new antenna configuration, the downlink beams towards the network edge. The beam index scanner can perform operations, further including scanning the downlink beams to determine new beam index scanner data for the new antenna configuration, and sending the new beam index scanner data to the antenna technician device. The new beam index scanner data can indicate that the downlink channel provided by the downlink beams is optimized.

In some embodiments, the system can include the antenna technician device. The antenna technician device can perform operations, including determining that the beam index scanner data indicates that the downlink channel provided by the downlink beams is not optimized. In some embodiments, the antenna technician device performs operations, further comprising presenting the beam index scanner data to the antenna technician, and presenting a prompt the antenna technician to either request a change to the first antenna configuration or to accept the first antenna configuration and deny any changes to the antenna array. In these embodiments, the antenna technician device can determine that the beam index scanner data indicates that the downlink channel provided by the downlink beams is not optimized based upon input provided by the antenna technician in response to the prompt. In some other embodiments, the antenna technician device can determine that the beam index scanner data indicates that the downlink channel provided by the downlink beams is not optimized based upon an analysis of the beam index scanner data performed by a machine learning system.

According to another aspect disclosed herein, a computer-readable storage medium can include computer-executable instructions that, when executed by a processor, cause the processor to perform operations. The operations can include scanning a plurality of downlink beams transmitted by an antenna array operating in a first antenna configuration to determine beam index scanner data for the first antenna configuration, sending the beam index scanner data for the first antenna configuration to an antenna technician device, scanning the plurality of downlink beams transmitted by the antenna array operating in a new antenna configuration to determine new beam index scanner data for the new antenna configuration, and sending the new beam index scanner data to the antenna technician device. The new antenna configuration can include the first antenna configuration that has been modified based, at least in part, upon the beam index scanner data. The new beam index scanner data can indicate that a downlink channel provided by the downlink beams is optimized.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
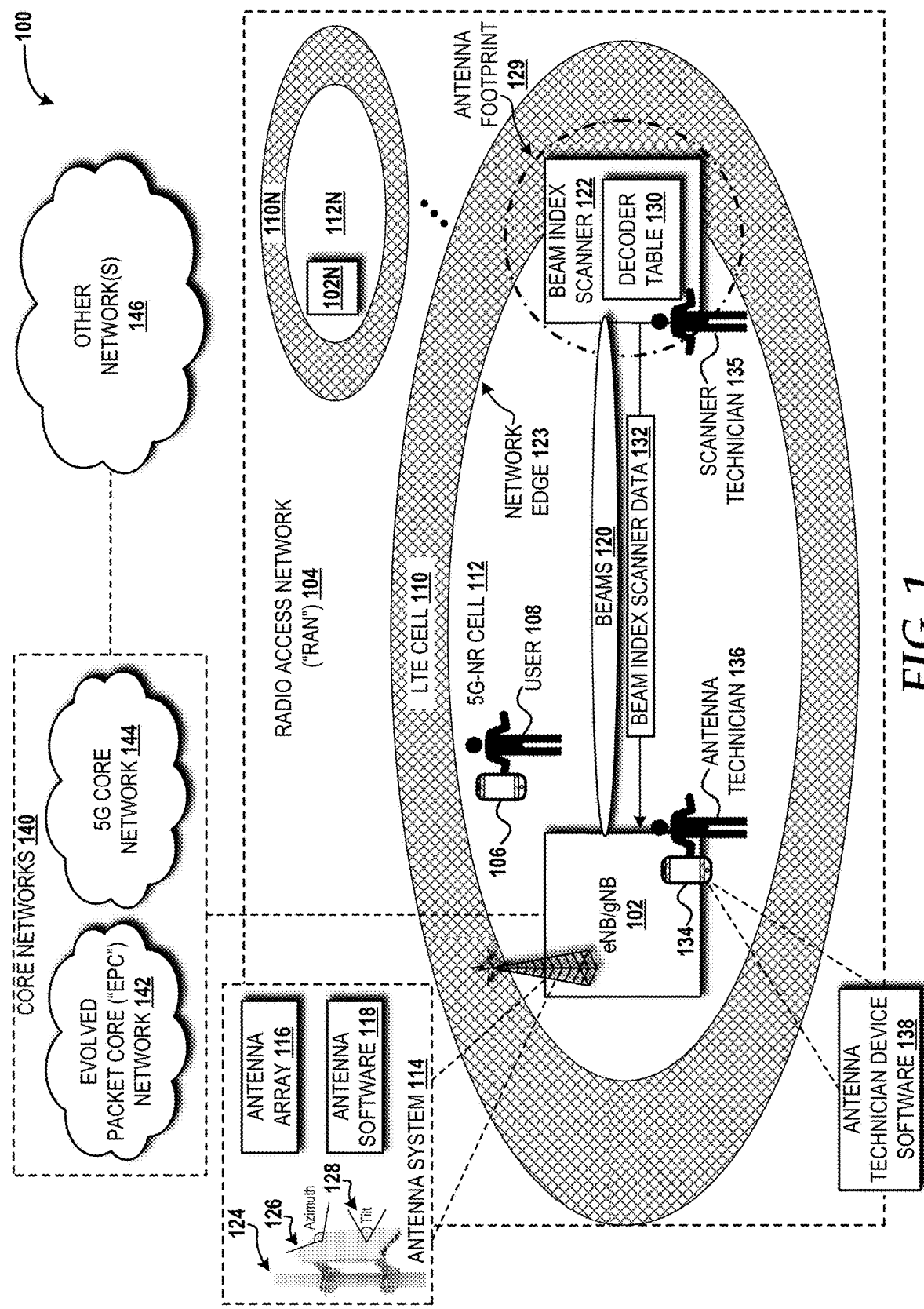
FIG. 1 is a block diagram illustrating aspects of an illustrative operating environment in which the concepts and technologies disclosed herein can be implemented.

The concepts and technologies disclosed herein are directed to mmWave idle channel optimization. In current mmWave systems, a mobile operator can use a beam index that is broadcast on a beam to focus a desired energy pattern of the beam into specific areas of an antenna for idle mode operation and tune the propagating footprint for the desired coverage areas. The concepts and technologies disclosed herein can be used to set an antenna's footprint (i.e., azimuth and tilt) with direct and actionable data. This data can be obtained by using a mapping of beams to a synchronization signal block ("SSB"), one or more decoding tables, and a beam scanner to decode the idle air interface. The data can be presented (e.g., to a technician) to provide insight regarding the highest signal strength to the lowest signal strength provided by a given antenna footprint. As patterns change, the pattern integrity and coverage can be field verified and any necessary changes can be made. Lastly, the data also can show antenna skew that can affect the system quality. Antenna skew is not available and cannot be determined with the passive antenna arrays in current use.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for mmWave idle channel optimization will be described.

Referring now to FIG. 1, an illustrative operating environment 100 in which the concepts and technologies disclosed herein can be implemented will be described. The operating environment 100 includes a combined Evolved Node Base eNodeB ("eNB") and mmWave Next Generation Node Base ("gNB"), which is shown as eNB/gNB 102 operating as part of a radio access network ("RAN") 104. The eNB/gNB 102 and the RAN 104 can be configured in accordance with one or more 3GPP technical specifications for next generation ("5G") RAN architecture, combined 4G/5G RAN architecture, or any revision thereof. The illustrated eNB/gNB 102 is shown as a simplified example to implement an NSA connectivity option for 5G, such as Option 3, Option 3A, or Option 3X as defined by 3GPP. Although a single eNB/gNB 102 is the focus of this description, a real-world implementation of an NSA connectivity option likely would have multiple eNB/gNBs 102N. It should be understood that, in some implementations, a dedicated gNB 102 may be used to implement an SA connectivity option for 5G, such as Option 2 as defined by 3GPP that does not rely upon a previous generation architecture (e.g., 4G Long-Term Evolution ("LTE") infrastructure). Accordingly, the illustrated embodiment should be construed as exemplary and not as being limiting in any way.

The eNB/gNB 102 can provide a radio/air interface over which one or more mobile devices, such as a mobile device 106 associated with a user 108 (e.g., a subscriber of a mobile telecommunications service—data, voice, or both), can connect to the RAN 104. The mobile device 106 may be a cellular phone, a feature phone, a smartphone, a mobile computing device, a tablet computing device, a portable television, a portable video game console, or any other computing device that includes one or more radio access components that are capable of connecting to and communicating with one or more RANs, such as the RAN 104, via one or more radio access components. In some embodiments, the mobile device 106 includes an integrated or external radio access component that facilitates wireless communication with one or more RANs, such as the RAN 104. The radio access component may be a cellular telephone that is in wired or wireless communication with the mobile device 106 to facilitate a tethered data connection to one or more RANs. Alternatively, the radio access component includes a wireless transceiver configured to send data to and receive data from one or more RANs and a universal serial bus ("USB") or another communication interface for connection to the mobile device 106 so as to enable tethering. In any case, the mobile device 106 can wirelessly communicate with one or more RANs over a radio/air interface in accordance with one or more radio access technologies ("RATs"). The mobile device 106 may also initiate, receive, and maintain voice calls with one or more other voice-enabled telecommunications devices, such as other mobile devices or landline devices (not shown). The mobile device 106 may also exchange Short Message Service ("SMS") messages, Multimedia Message Service ("MMS") messages, email, and/or other messages with other devices (not shown).

In the illustrated example, the eNB/gNB 102 provides dual connectivity for the mobile device 106 to access an LTE cell 110 and a 5G-NR cell 112. Similarly, one or more additional eNB/gNBs 102N can provide dual connectivity for the mobile device 106 to access one or more additional LTE cells 110N and 5G-NR cells 112N as the mobile device 106 moves throughout an area served by the RAN 104. The LTE cells 110-110N are geographical areas served by the eNB portion of the eNB/gNBs 102-102N. The 5G-NR cells 112-112N are geographical areas served by the gNB portion of the eNB/gNBs 102-102N. A mobile network operator ("MNO") can install the eNB/gNBs 102-102N to provide network access for the mobile device 106 (and/or other devices that are not shown) in specific geographic locations. The remaining description will focus on a single eNB/gNB 102 that provides network access for the mobile device 106 within the geographical areas served by the LTE cell 110 and the 5G-NR cell 112.

The eNB/gNB 102 can include one or more LTE radio components and one or more 5G-NR radio components to generate radio waves to be broadcast by an antenna system 114. A more detailed eNB/gNB architecture is illustrated and described herein with reference to FIG. 4. In accordance with 3GPP specifications, the antenna system 114 can be designed as part of the eNB/gNB 102 due to the nature of mmWaves, as those skilled in the art will understand. The antenna system 114 can include an antenna array 116 and antenna software 118. The antenna array 116 can be configured in accordance with any antenna design specifications to provide a physical interface for receiving and transmitting radio waves as one or more beams 120 to and from one or more devices, such as the mobile device 106. The antenna array 116 can be designed or selected (e.g., off-the-shelf) based upon the needs of a given implementation. Proprietary designs for the antenna array 116 are contemplated, as well as those that are commercially available to MNOs (e.g., from one or more vendors). The antenna array 116 can include any number of antenna elements arranged in rows and columns. Each antenna element can be dually-polarized. The antenna array 116 can be divided into a plurality of sub-arrays. The antenna array 116 can be any size and any shape. The antenna array 116 can be programmed via the antenna software 118, such as to set or change the gain of the antenna array 116 or a specific portion thereof to achieve a desired radiation pattern. The antenna software 118 can be proprietary or commercially available software that is provided as part of the antenna system 114 or is otherwise available from a vendor or the open source community.

In accordance with the concepts and technologies disclosed herein, the beams (downlink) 120 can be received by a beam index scanner 122 that is operating in idle mode at a network edge 123 (i.e., the edge of the 5G-NR cell 112). The beam index scanner 122 is illustrated as being in association with a scanner technician 135 who may be employed by or a contractor of the MNO to move the beam index scanner 122 around the 5G-NR cell 112 to determine whether the antenna system 114 is configured in an antenna configuration 124 to provide optimal coverage to the beam index scanner 122 in preparation for optimizing idle mode operations of other devices, such as the mobile device 106 associated with the user 108. The antenna configuration 124 can define how the antenna array 116 is positioned based upon an azimuth (horizontal) value 126 and a tilt (vertical) value 128. The radiation provided by the antenna system 114 when in the antenna configuration 124 is shown as the antenna footprint 129.

The beam index scanner 122 can receive the beams 120 transmitted by the antenna array 116 and can determine, based at least in part upon, a mapping of beams to a synchronization signal block ("SSB") (wide beam; example shown in FIG. 2B) and one or more decoder tables 130, to decode the idle air interface provided by the antenna system 114. The beam index scanner 122 can generate beam index scanner data 132 based upon the decoding. The beam index scanner data 132 can identify the beams 120 received by the beam index scanner 122, including the signal strength of each of the beams 120. The beam index scanner 122 can send the beam index scanner data 132 to one or more entities for analysis. In the illustrated example, the beam index scanner 122 sends the beam index scanner data 132 to an antenna technician device 134 operated by an antenna technician 136. The antenna technician device 134 can be configured to execute antenna technician device software 138 to facilitate a review, by the antenna technician 136, of the beam index scanner data 132. The antenna technician 136 can make any changes necessary to the antenna configuration 124 (e.g., adjust the azimuth value 126 and/or the tilt value 128) to optimize (as best possible) the antenna footprint 129 (i.e., area covered by the antenna system 114) received by the beam index scanner 122 at the network edge 123. Although the antenna footprint 129 at the network edge 123 is shown, other locations within the 5G-NR cell 112 can be analyzed in accordance with the concepts and technologies disclosed herein.

Figure 2A:
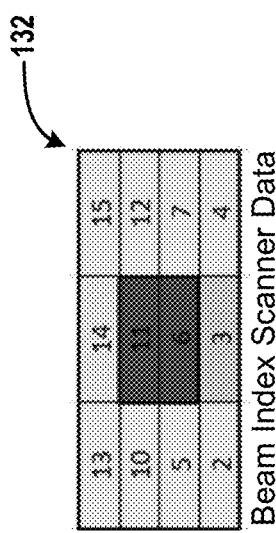
FIGS. 2A-2B are diagrams illustrating a non-limiting example of beam index scanner data and an antenna mapping, respectively.
Figure 2B:
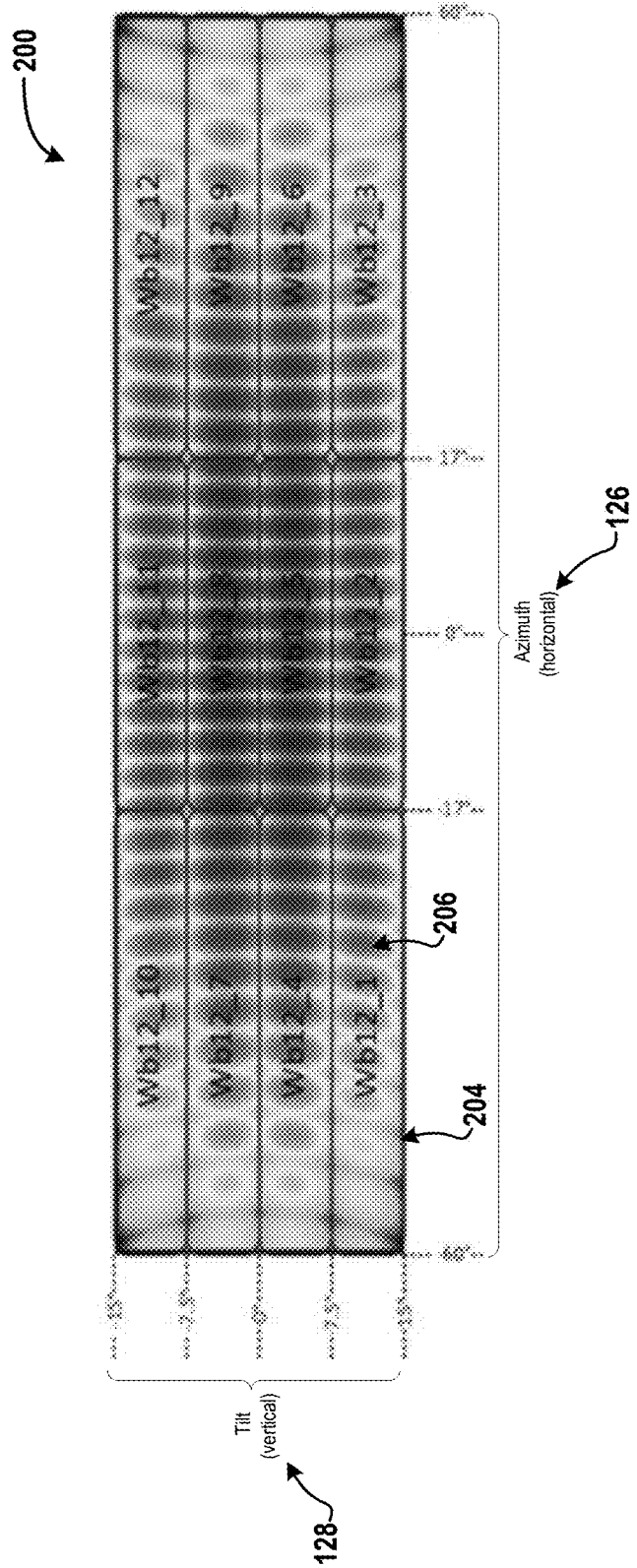

Turning briefly to FIGS. 2A-2B, an example of the beam index scanner data 132 is shown in FIG. 2A. In addition, an antenna mapping 200 associated with the antenna array 116 is illustrated with degree values for the azimuth value 126 and the tilt value 128 for the antenna configuration 124. The antenna mapping 200 can be provided to the MNO by a vendor, manufacturer, or other entity to show how the beams 120 are mapped to the antenna array 116. In the illustrated example, the antenna mapping 200 includes 12 wide beams (labeled Wb12_1 through WB12_12) and 136 narrow beams (indicated by the colored circles throughout the wide beams). The narrow beams are colored from blue, green, yellow, red, and various shades of each. The darkest red circles are indicative of the portions of the antenna array 116 that are set to the highest gain. The beam index scanner data 132 corresponds to the antenna mapping 200 with what the beam index scanner 122 actually detects. The numbering convention used in both the antenna mapping 200 and the beam index scanner data 132 is, more or less, a matter of choice left up to the vendor, manufacturer, MNO, or other entity. In the example shown, the antenna technician device software 138 executed by the technician device 134 can be used by the antenna technician 136 to determine that the antenna configuration 124 of the antenna array 116 should be adjusted to change the tilt value 128 to better show beam 14 in the beam index scanner data 132. In particular, the antenna array 116 could be improved by tilting the antenna array 116 up by 7 degrees or thereabouts. The antenna technician 136 can use this information to physically adjust the tilt value 128 of the antenna configuration 124. The antenna array 116 can send additional beams 120 to the beam index scanner 122 to check whether the adjustment(s) made to the antenna configuration 124 improved the antenna footprint 129 at the network edge 123 (or elsewhere in the 5G-NR cell 112 as the case may be).

Returning to FIG. 1, the eNB/gNB 102 is shown as being in communication with core networks 140, including an evolved packet core ("EPC") network 142 and a 5G core network 144. The core networks 140 are, in turn, in communication with one or more other networks 146 such as one or more other public land mobile networks ("PLMNs"), one or more packet data networks ("PDNs") (e.g., the Internet), combinations thereof, and/or the like. The mobile device 106 can access services (not shown) provided through the other network(s) 146.

The eNB/gNB 102 can connect to the EPC network 142 via an S1 interface, and more specifically to a mobility management entity ("MME") (not shown) via an S1-MME, and to a serving gateway ("S-GW") via an S1-U interface. The EPC network 142 can include one or more MMES, one or more S-GW (which may be combined with one or more packet gateways ("P-GWs")), and one or more home subscriber servers ("HSS"). Although not shown in the illustrated example, the EPC network 142 can include these network elements and may additionally include other network elements not specifically mentioned herein. In general, the EPC network 142 can be established based upon 3GPP standards specifications.

The core network components of the EPC network 142 can be implemented as physical network functions ("PNFs") having hardware and software components. The core network components of the EPC network 142 can additionally or alternatively be provided, at least in part, by virtual network functions ("VNFs"). For example, the core network components can be realized as VNFs that utilize a unified commercial-off-the-shelf ("COTS") hardware and flexible resources shared model with the application software for the respective core network components running on one or more virtual machines ("VMs"). Moreover, the core network components can be embodied as VNFs in one or more VNF pools, each of which can include a plurality of VNFs providing a particular core network function.

An MME can be configured in accordance with 3GPP standards specifications and can perform operations to control signaling traffic related to mobility and security for access to the eNB portion of the eNB/gNB 102 via the S1-MME interface. The MME also can be in communication with an HSS via an S6a interface and a combined S/PGW via an S11 interface. These interfaces are defined as part of 3GPP standards specifications.

An SGW and a PGW can be configured in accordance with 3GPP standards specifications. The SGW can provide a point of interconnect between the radio-side (e.g., the eNB portion of the eNB/gNB 102) and the EPC network 142. The SGW can serve devices by routing incoming and outgoing IP packets between the eNB portion of the eNB/gNB 102 and the EPC network 142. The PGW interconnects the EPC network 142 to the other networks 146. The PGW routes IP packets to and from the other network(s) 146. The PGW also perform operations such as IP address/prefix allocation, policy control, and charging. The SGW and the PGW can be in communication with the MME via an S11 interface and with the other network(s) 146 via an SGi interface. These interfaces are defined as part of 3GPP standards specifications.

An HSS can be configured in accordance with 3GPP standards specifications. The HSS is a database that contains user-related information for users of devices, such as the user 108 of the mobile device 106. The HSS can provide support functions to the MME for mobility management, call and data session setup, user authentication, and access authorization.

At the edge of the EPC network 142, the MME and S-GW can be connected over the IP-based S1 interface to the eNB/gNB 102. The eNB and the gNB are logically different components that can communicate with each other via a standardized IP interface (i.e., the X2 interface). If the eNB and gNB are combined into a single hardware node, such as in the illustrated example, the X2 interface is an internal interface (or logical interface) between the two components.

The 5G core network 144 can include network functions that provide functionality similar to that of the EPC network 142 for LTE but for 5G technologies such as mmWave. For example, current 3GPP standards define a 5G core network architecture as having an access and mobility management function ("AMF") that provides mobility management functionality similar to that of an MME in the EPC network 142; a session management function ("SMF") that provides session management functionality similar to that of an MME and some of the S/P-GW functions, including IP address allocation, in the EPC network 142; an authentication server function ("AUSF") managed subscriber authentication during registration or re-registration with the 5G core network 144; and user plane function ("UPF") combines the user traffic transport functions previously performed by the S/P-GW in the EPC network 142, among others. While 3GPP has defined some of these network functions, these network functions may be split into greater granularity to perform specific functions, may be combined, and/or additional functions may be added by the time the MNO deploys a live 5G network. As such, the 5G core network 144 is intended to encompass any and all 5G core network functions that are currently defined in technical specifications currently available and revisions thereof made in the future.

Figure 3A:
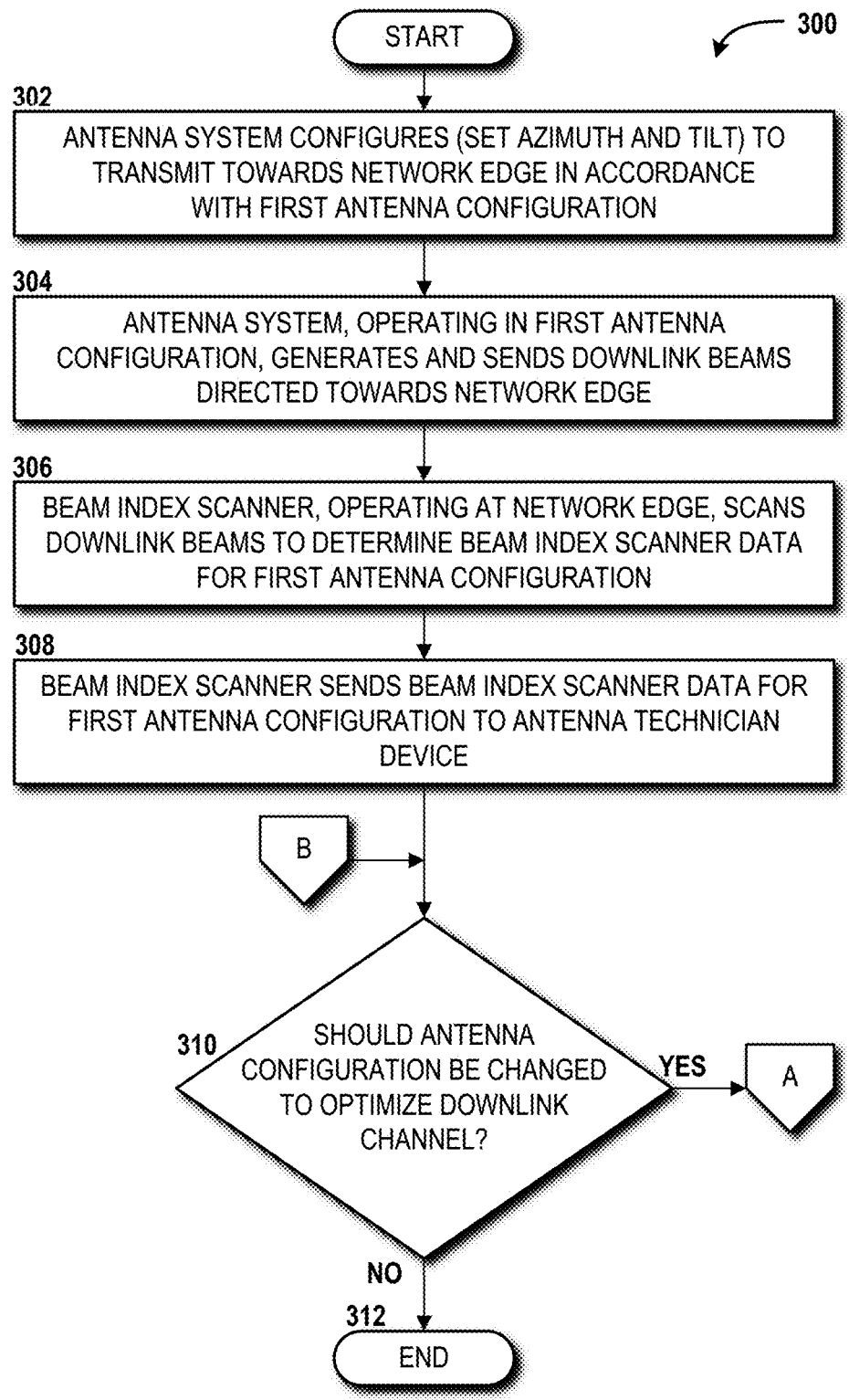
FIGS. 3A-3B are flow diagrams illustrating aspects of a method for optimizing an mmWave idle channel, according to an illustrative embodiment.
Figure 3B:
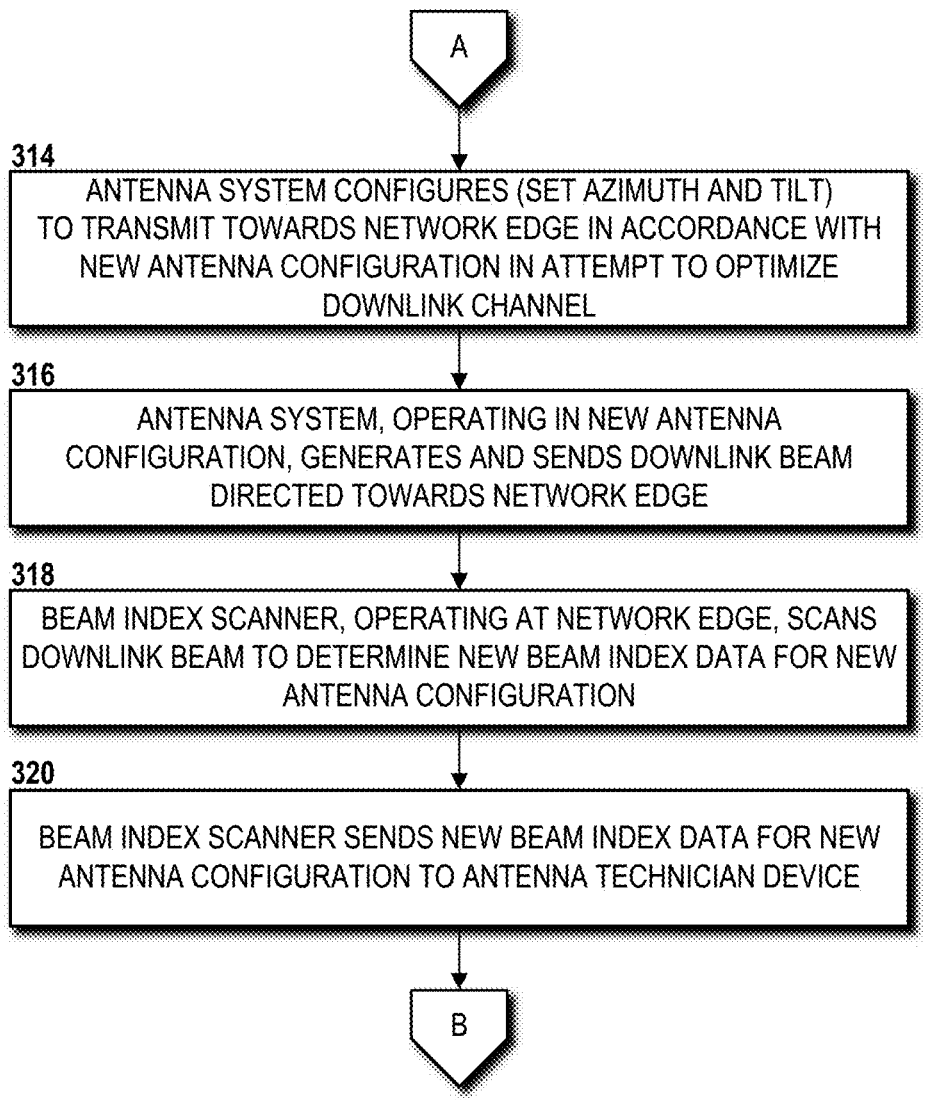

Referring now to FIGS. 3A-3B, a flow diagram illustrating a method for optimizing an mmWave idle channel in accordance with the concepts and technologies disclosed herein will be described, according to an illustrative embodiment. The method 300 will be described with reference to FIGS. 3A-3B and further reference to FIGS. 1 and 2. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, operations of the method 300 may be described as being performed, at least in part, by the eNB/gNB 102, the antenna system 114, the beam index scanner 122, the antenna technician device 134, and/or other network elements, systems, and/or device disclosed herein, via execution, by one or more processors, of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 begins and proceeds to operation 302. At operation 302, the antenna system 114 can configure the antenna array 116 to transmit towards the network edge 123 in accordance with a first antenna configuration. For example, an initial setup of the antenna configuration 124 can set the azimuth value 126 and the tilt value 128 to achieve the antenna footprint 129 for the network edge 123. The antenna array 116, in some embodiments, is physically manipulated to set/adjust the azimuth value 126 and/or the tilt value 128. The antenna array 116 may be physically manipulated by the antenna technician 136, by one or more servos, and/or by another robotic mechanism. How the antenna is physically manipulated in practice will be based upon the capabilities of the MNO.

From operation 302, the method 300 proceeds to operation 304. At operation 304, the antenna system 114, operating in the first (initial) antenna configuration 124, can generate and send downlink beams directed towards the network edge 123. In the example shown in FIG. 2B, the antenna mapping 200 shows that the antenna array 116 is capable of radiating 12 distinct wide band beams (e.g., SSBs). As noted above, a given antenna array 116 may be capable of radiating less than 12 or more than 12 distinct wide band beams, and the corresponding antenna mapping for these beams can be provided by the vendor or other entity that supplies the antenna array 116 to the MNO.

From operation 304, the method 300 proceeds to operation 306. At operation 306, the beam index scanner 122, operating at the network edge 123, can scan the beams 120 to determine the beam index scanner data 132 for the first (initial) antenna configuration 124. From operation 306, the method 300 proceeds to operation 308. At operation 308, the beam index scanner 122 sends the beam index scanner data 122 for the first (initial) antenna configuration 124 to the antenna technician device 134.

From operation 308, the method 300 proceeds to operation 310. At operation 310, the antenna technician device 134 can determine if the antenna configuration 124 should be changed to optimize the downlink channel. In some embodiments, the antenna technician device 134, via execution of the antenna technician device software 138, can present the beam index scanner data 122 to the antenna technician 136 and can prompt the antenna technician 136 to either (1) request a change to the antenna configuration 124 in an attempt to optimize the downlink channel, or (2) accept the antenna configuration 124 and deny further changes. In some other embodiments, the antenna technician device software 138 can implement an algorithm, such as a machine learning algorithm, to recommend whether a change to the antenna configuration 124 should be made. This recommendation can be presented to the antenna technician 136 who may have the authority to approve or deny the recommendation. In other embodiments, the antenna technician device software 138 can be given permission to either (1) request a change to the antenna configuration 124 in an attempt to optimize the downlink channel, or (2) accept the antenna configuration 124 and deny further changes, on a behalf of the antenna technician 136. Moreover, although the antenna technician device 134 is described herein as being associated with the antenna technician 136, in some embodiments, the antenna technician device 134 may be provided as part of the eNB/gNB 102 or otherwise in communication with the eNB/gNB 102 such as to provide new values for the azimuth 126 and/or the tilt 128 to change the antenna configuration 124 as needed.

If, at operation 310, the antenna technician device 134 determines that the antenna configuration 124 should not be changed, the method 300 proceeds to operation 312. At operation 312, the method 300 can end. If, however, at operation 310, the antenna technician device 134 determines that the antenna configuration 124 should be changed to optimize the downlink channel, the method 300 proceeds to operation 314 shown in FIG. 3B.

Referring now to FIG. 3B, and particularly operation 314, the antenna system can configure the antenna array 116 to transmit towards the network edge 123 in accordance with a new antenna configuration 124. The new antenna configuration 124 can set the azimuth value 126 and the tilt value 128 in an attempt to optimize the downlink channel provided by the beams 120. The azimuth value 126 and/or the tilt value 128 can be changed from the first (initial) antenna configuration 124.

From operation 314, the method 300 proceeds to operation 316. At operation 316, the antenna system 114, operating in the new antenna configuration 124, can generate and send downlink beams directed towards the network edge 123. From operation 316, the method 300 proceeds to operation 318. At operation 318, the beam index scanner 122, operating at the network edge 123, can scan the beams 120 to determine the beam index scanner data 132 for the new antenna configuration 124. From operation 318, the method 300 proceeds to operation 320. At operation 320, the beam index scanner 122 sends the beam index scanner data 122 for the new antenna configuration 124 to the antenna technician device 134.

From operation 320, the method 300 returns to FIG. 3A, and particularly operation 310. The method 300 then proceeds as described above. It should be understood that additional iterations of the operations 310, 314, 316, 318, and 320 can be performed for any number of new antenna configurations until the downlink channel is optimized as determined by the MNO.

Figure 4:
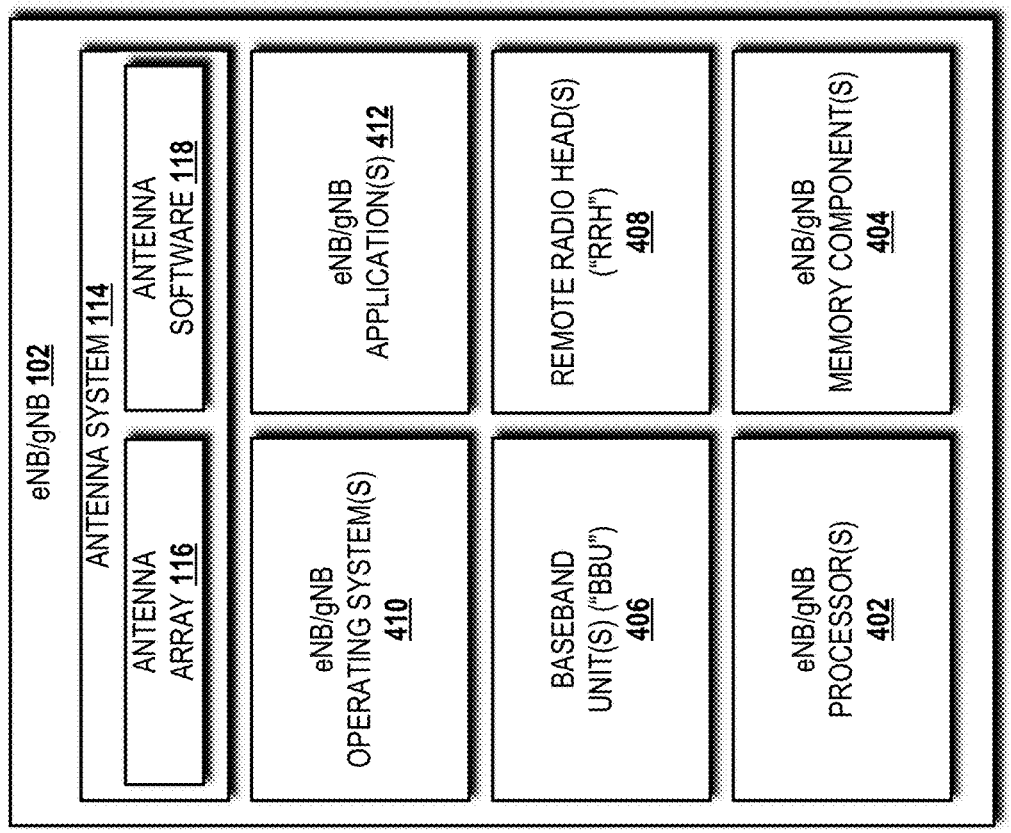
FIG. 4 is a block diagram illustrating aspects of an illustrative combined eNB/gNB capable of implementing aspects of the embodiments presented herein.

Turning now to FIG. 4, an example eNB/gNB architecture 400 illustrating aspects of the eNB/gNB 102 introduced above with respect to FIG. 1 will be described. The eNB/gNB 102 illustrated in FIG. 4 includes one or more eNB/gNB processors 402, one or more eNB/gNB memory components 404, one or more baseband units ("BBUs") 406, one or more remote radio heads ("RRHs") 408, one or more eNB/gNB operating systems 410, one or more eNB/gNB applications 412, and the antenna system 114, including the antenna array 116 and the antenna software 118. Each of these components will now be described in detail.

An eNB/gNB processor 402 can include one or more processing units configured to process data, execute computer-executable instructions of one or more application programs, and communicate with other components of the eNB/gNB 102 in order to perform various functionality described herein. The eNB/gNB processor 402 may be utilized to execute aspects of the eNB/gNB operating system(s) 410 and the eNB/gNB application(s) 412. In some embodiments, the eNB/gNB processor 402 is or includes a central processing unit ("CPU"), a communications processor, or a field-programmable gate array ("FPGA"). In some embodiments, the eNB/gNB processor 402 is or is included in a system-on-a-chip ("SoC") along with one or more of the other components described herein below. For example, the SoC may include the eNB/gNB processor 402, a GPU, the BBU(s) 406, the RRH(s) 408, or some combination thereof. In some embodiments, the eNB/gNB processor 402 is fabricated, in part, utilizing a package-on-package ("PoP") integrated circuit packaging technique. Moreover, the eNB/gNB processor 402 may be a single core or multi-core processor. The eNB/gNB processor 402 may be created in accordance with an ARM architecture, available for license from ARM HOLDINGS of Cambridge, United Kingdom. Alternatively, the eNB/gNB processor 402 may be created in accordance with an x86 architecture, such as is available from INTEL CORPORATION of Mountain View, Calif. and others. In some embodiments, the eNB/gNB processor 402 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an OMAP SoC, available from TEXAS INSTRUMENTS of Dallas, Tex., a customized version of any of the above SoCs, or a proprietary SoC.

The eNB/gNB memory components 404 can include a RAM, a ROM, an integrated storage memory, and a removable storage memory, or some combination thereof. In some embodiments, the eNB/gNB memory components 404 store the eNB/gNB operating system(s) 410 or a portion thereof (e.g., operating system kernel or bootloader), and/or the eNB/gNB application(s) 412.

The BBU 406 is the baseband processing unit of the eNB/gNB 102. The BBU 406 can include other components shown, including, for example, the eNB/gNB processor(s) 402, the eNB/gNB memory component(s) 404, the eNB operating system(s) 410, the eNB/gNB application(s) 412, or some combination thereof. The BBU 406 can receive IP packets from the EPC network 142 and/or the 5G core network 144 (see FIG. 1) and can modulate the IP packets into digital baseband signals. The BBU 406 can send the digital baseband signals to the RRH(s) 408. The digital baseband signals received by the RRH(s) 408 can be demodulated and IP packets can be transmitted to the EPC network 142 and/or the 5G core network 144. The RRH(s) 408 can transmit and receive wireless signals to/from devices such as the mobile device 106 and the beam index scanner 122. The RRH(s) 408 also convert the digital baseband signals from the BBU 406 that have been subjected to protocol-specific processing into RF signals and power amplifies the signals for transmission to the devices such as the mobile device 106 and the beam index scanner 122. The RF signals received from the devices are amplified and converted to digital baseband signals for transmission to the BBU 406.

The eNB/gNB operating system 408 is a program for controlling the operation of the eNB/gNB 102. The eNB/gNB operating system 408 can include a proprietary operating system, an embedded operating system, a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

An eNB/gNB application 412 can be any application that performs operations for the eNB/gNB 102. For example, the eNB/gNB application(s) 412 can be or can include software compliant with 3GPP standards for call control processing, performance management, self-organizing network functions, and the like.

Figure 5:
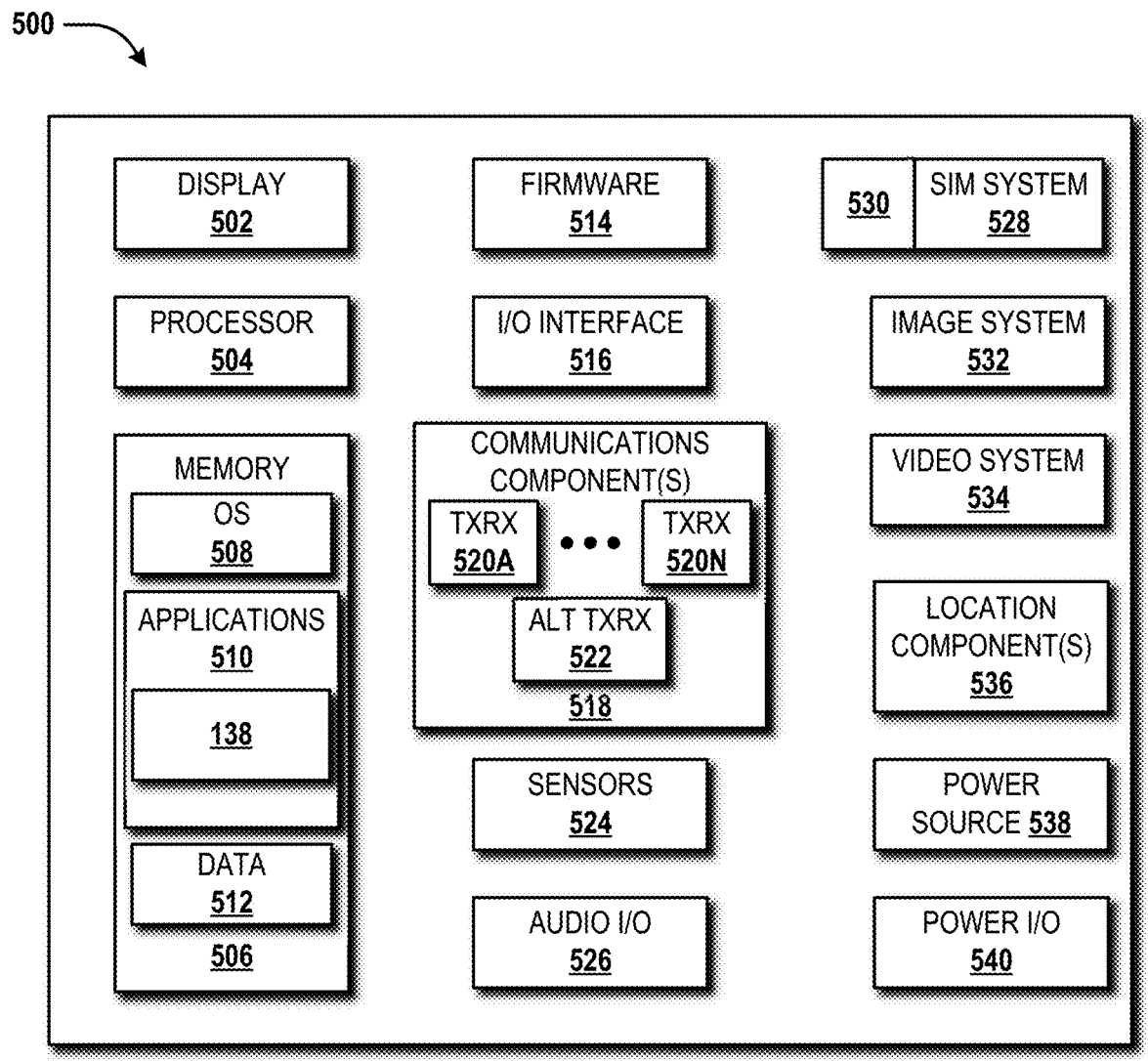
FIG. 5 is a block diagram illustrating an example mobile device, according to an illustrative embodiment.

Turning now to FIG. 5, an illustrative mobile device 500 and components thereof will be described. In some embodiments, the mobile device 106 and/or the antenna technician device 134 described above with reference to FIG. 1 can be configured as and/or can have an architecture similar or identical to the mobile device 500 described herein in FIG. 5. It should be understood, however, that the mobile device 106 and/or the antenna technician device 134 may or may not include the functionality described herein with reference to FIG. 5. While connections are not shown between the various components illustrated in FIG. 5, it should be understood that some, none, or all of the components illustrated in FIG. 5 can be configured to interact with one another to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display output of the antenna technician device software 138, the beam index scanner data 132, network connection information, various GUI elements, text, images, video, virtual keypads and/or keyboards, messaging data, notification messages, metadata, Internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510 (e.g., the antenna technician device software 138), other computer-executable instructions stored in the memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in data communications, entering/deleting data, entering and setting user IDs and passwords for device access, configuring settings, manipulating content and/or settings, multimode interaction, interacting with other applications 510, and otherwise facilitating user interaction with the operating system 508, the applications 510, and/or other types or instances of data 512 that can be stored at the mobile device 500.

The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, presence status information, user IDs, passwords, and application initiation (start-up) requests. In some embodiments, the I/O interface 516 can include a hardwire connection such as a universal serial bus ("USB") port, a mini-USB port, a micro-USB port, an audio jack, a PS2 port, an IEEE 1395 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments, one or more of the transceivers of the communications component 518 may be configured to communicate using GSM, CDMAONE, CDMA2000, LTE, and various other 2G, 2.5G, 3G, 4G, 4.5G, 5G, and greater generation technology standards. Moreover, the communications component 518 may facilitate communications over various channel access methods (which may or may not be used by the aforementioned standards) including, but not limited to, TDMA, FDMA, W-CDMA, OFDM, SDMA, and the like.

In addition, the communications component 518 may facilitate data communications using GPRS, EDGE, the HSPA protocol family including HSDPA, EUL or otherwise termed HSUPA, HSPA+, and various other current and future wireless data access standards. In the illustrated embodiment, the communications component 518 can include a first transceiver ("TxRx") 520A that can operate in a first communications mode (e.g., GSM). The communications component 518 also can include an Nth transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted-GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 500 or other devices or computers described herein, such as the computer system 500 described above with reference to FIG. 5. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 500 in order to store and execute the software components presented herein. It is also contemplated that the mobile device 500 may not include all of the components shown in FIG. 5, may include other components that are not explicitly shown in FIG. 5, or may utilize an architecture completely different than that shown in FIG. 5.

Figure 6:
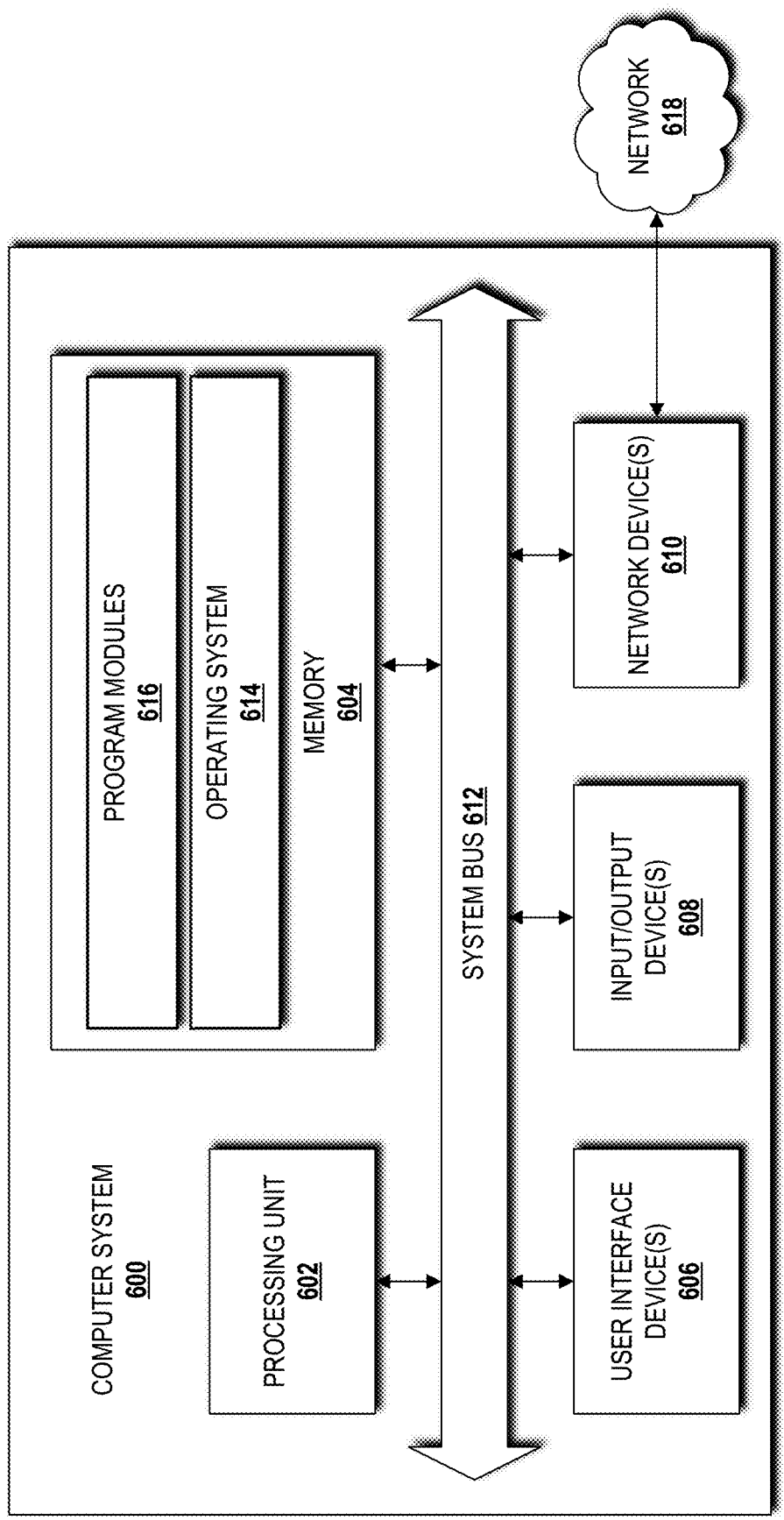
FIG. 6 is a block diagram illustrating an example computer system capable of implementing aspects of the embodiments presented herein.

Turning now to FIG. 6 is a block diagram illustrating a computer system 600 configured to provide the functionality in accordance with various embodiments of the concepts and technologies disclosed herein. The systems, devices, and other components disclosed herein, such as the beam index scanner 122 and the antenna technician device 134 can utilize, at least in part, an architecture that is the same as or at least similar to the architecture of the computer system 600. It should be understood, however, that modification to the architecture may be made to facilitate certain interactions among elements described herein.

The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The illustrated memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 616 may include various software and/or program modules to perform the various operations described herein. The program modules 616 and/or other programs can be embodied in computer-readable media containing instructions that, when executed by the processing unit 602, perform various operations such as those described herein. According to embodiments, the program modules 616 may be embodied in hardware, software, firmware, or any combination thereof.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, PDAs, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer. In some embodiments, the I/O devices 608 can be used for manual controls for operations to exercise under certain emergency situations.

The network devices 610 enable the computer system 600 to communicate with other networks or remote systems via a network 618, such as the RAN 104, the core networks 140, and/or the other networks 146. Examples of the network devices 610 include, but are not limited to, a modem, a radio frequency ("RF") or infrared ("IR") transceiver, a telephonic interface, a bridge, a router, or a network card. The network 618 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 618 may be or may include a wired network such as, but not limited to, a Wide Area Network ("WAN"), a wired Personal Area Network ("PAN"), or a wired Metropolitan Area Network ("MAN").

Figure 7:
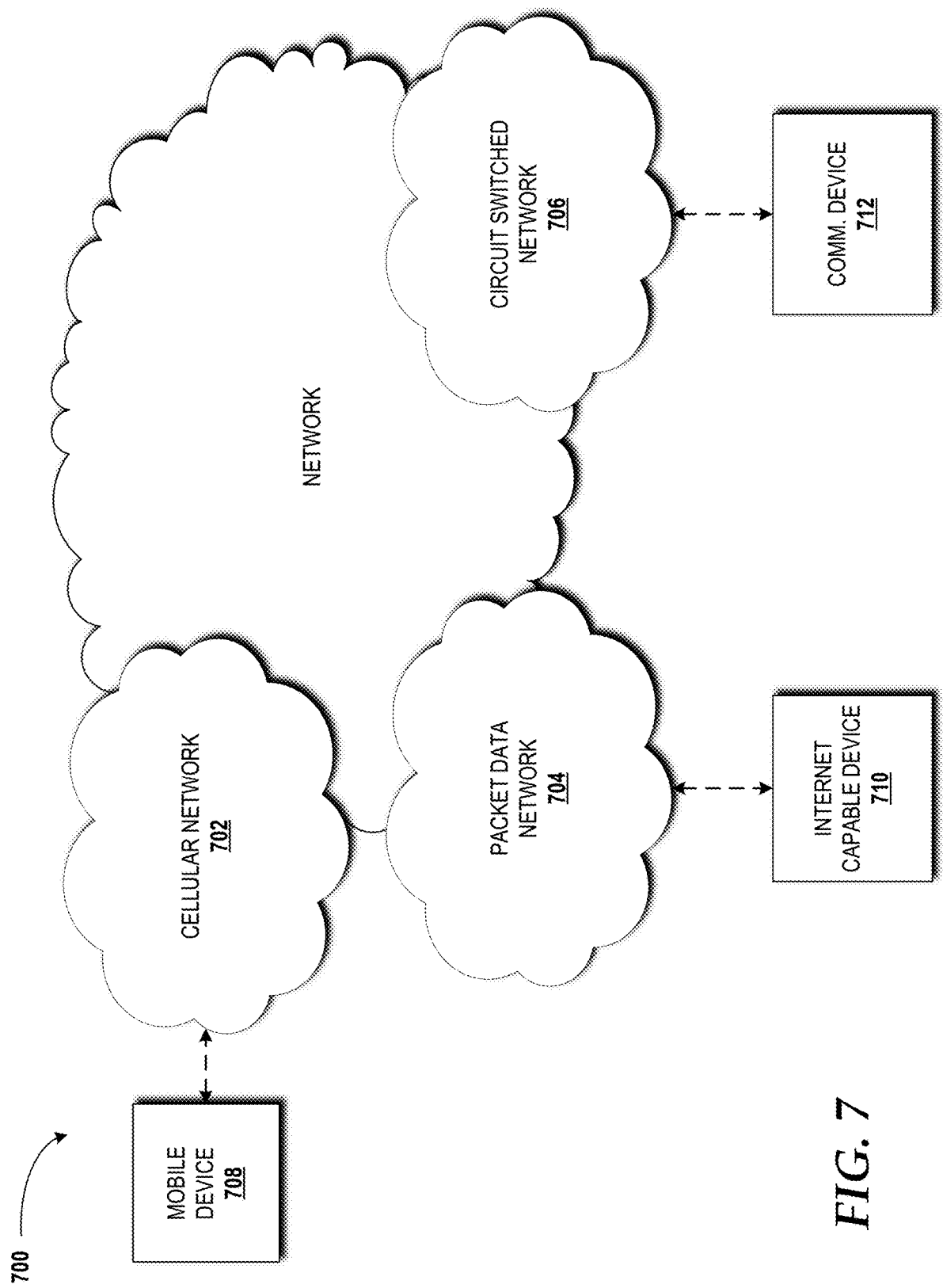
FIG. 7 is a diagram illustrating a network, according to an illustrative embodiment.

Turning now to FIG. 7, details of a network 700 are illustrated, according to an illustrative embodiment. In some embodiments, the network 700 can include the RAN 104, the core networks 140, and/or other networks 146. The network 700 includes a cellular network 702, a packet data network 704, for example, the Internet, and a circuit switched network 706, for example, a public switched telephone network ("PSTN"). The cellular network 702 includes various components such as, but not limited to, base transceiver stations ("BTSs"), NBs or eNBs, combination eNB/gNB such as the eNB/gNB 102, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, the mobile device 106, the beam index scanner 122, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards such as LTE, or the like, as well as evolved and future mobile standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system ("POTS"). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network is used to refer broadly to any combination of the networks 702, 704, 706 shown in FIG. 7. It should be appreciated that substantially all of the functionality described with reference to the network(s) 114 can be performed by the cellular network 702, the packet data network 704, and/or the circuit switched network 706, alone or in combination with other networks, network elements, and the like.

Figure 8:
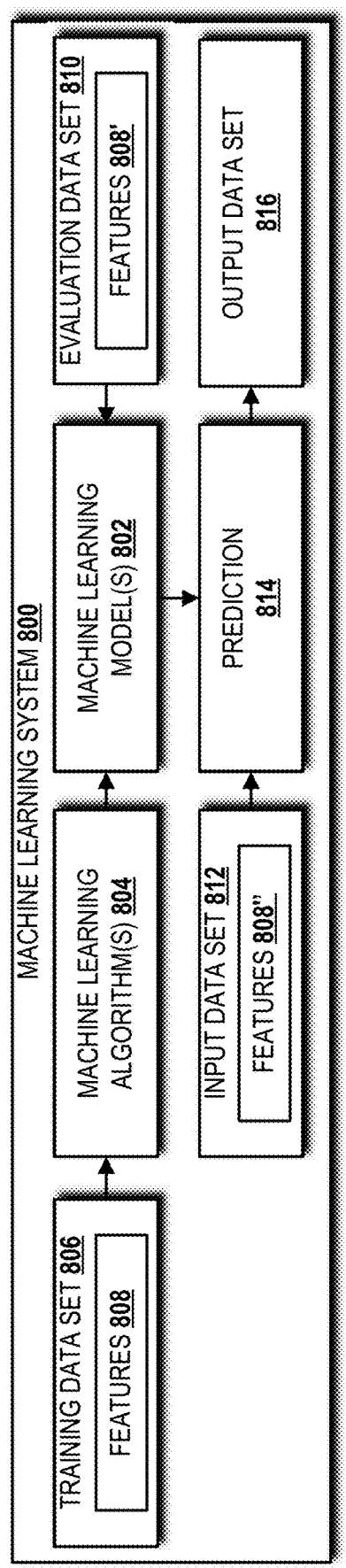
FIG. 8 is a block diagram illustrating a machine learning system capable of implementing aspects of the concept and technologies disclosed herein.

Turning now to FIG. 8, a machine learning system 800 capable of implementing aspects of the embodiments disclosed herein will be described. In some embodiments, the antenna technician device software 138 can implement or otherwise utilize a machine learning system such as the machine learning system 800. The illustrated machine learning system 800 includes one or more machine learning models 802. The machine learning models 802 can include supervised and/or semi-supervised learning models. The machine learning model(s) 802 can be created by the machine learning system 800 based upon one or more machine learning algorithms 804. The machine learning algorithm(s) 804 can be any existing, well-known algorithm, any proprietary algorithms, or any future machine learning algorithm. Some example machine learning algorithms 804 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 804 based upon the problem(s) to be solved by machine learning via the machine learning system 800.

The machine learning system 800 can control the creation of the machine learning models 802 via one or more training parameters. In some embodiments, the training parameters are selected modelers at the direction of an enterprise, for example. Alternatively, in some embodiments, the training parameters are automatically selected based upon data provided in one or more training data sets 806. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 804 converges to the optimal weights. The machine learning algorithm 804 can update the weights for every data example included in the training data set 806. The size of an update is controlled by the learning rate. A learning rate that is too high might prevent the machine learning algorithm 804 from converging to the optimal weights. A learning rate that is too low might result in the machine learning algorithm 804 requiring multiple training passes to converge to the optimal weights.

The model size is regulated by the number of input features ("features") 808 in the training data set 806. A greater number of features 808 yields a greater number of possible patterns that can be determined from the training data set 806. The model size should be selected to balance the resources (e.g., compute, memory, storage, etc.) needed for training and the predictive power of the resultant machine learning model 802.

The number of training passes indicates the number of training passes that the machine learning algorithm 804 makes over the training data set 806 during the training process. The number of training passes can be adjusted based, for example, on the size of the training data set 806, with larger training data sets being exposed to fewer training passes in consideration of time and/or resource utilization. The effectiveness of the resultant machine learning model 802 can be increased by multiple training passes.

Data shuffling is a training parameter designed to prevent the machine learning algorithm 804 from reaching false optimal weights due to the order in which data contained in the training data set 806 is processed. For example, data provided in rows and columns might be analyzed first row, second row, third row, etc., and thus an optimal weight might be obtained well before a full range of data has been considered. By data shuffling, the data contained in the training data set 806 can be analyzed more thoroughly and mitigate bias in the resultant machine learning model 802.

Regularization is a training parameter that helps to prevent the machine learning model 802 from memorizing training data from the training data set 806. In other words, the machine learning model 802 fits the training data set 806, but the predictive performance of the machine learning model 802 is not acceptable. Regularization helps the machine learning system 800 avoid this overfitting/memorization problem by adjusting extreme weight values of the features 808. For example, a feature that has a small weight value relative to the weight values of the other features in the training data set 806 can be adjusted to zero.

The machine learning system 800 can determine model accuracy after training by using one or more evaluation data sets 810 containing the same features 808' as the features 808 in the training data set 806. This also prevents the machine learning model 802 from simply memorizing the data contained in the training data set 806. The number of evaluation passes made by the machine learning system 800 can be regulated by a target model accuracy that, when reached, ends the evaluation process and the machine learning model 802 is considered ready for deployment.

After deployment, the machine learning model 802 can perform a prediction operation ("prediction") 814 with an input data set 812 having the same features 808" as the features 808 in the training data set 806 and the features 808' of the evaluation data set 810. The results of the prediction 814 are included in an output data set 816 consisting of predicted data. The machine learning model 802 can perform other operations, such as regression, classification, and others. As such, the example illustrated in FIG. 8 should not be construed as being limiting in any way.

Based on the foregoing, it should be appreciated that concepts and technologies directed to mmWave idle channel optimization have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. An antenna system comprising:
an antenna array;
a processor; and
a memory comprising instructions that, when executed by the processor, cause the processor to perform operations comprising
generating downlink beams directed towards a network edge,
sending the downlink beams towards the network edge, wherein a beam index scanner operating at the network edge scans the downlink beams to determine beam index scanner data for an antenna configuration of the antenna array, and wherein the beam index scanner data indicates that a downlink channel provided by the downlink beams is not optimized,
receiving, from an antenna technician device, a request for a new antenna configuration to optimize the downlink channel, and
configuring the antenna array in the new antenna configuration to optimize the downlink channel.

2. The antenna system of claim 1, wherein the operations further comprise:
generating new downlink beams directed towards the network edge; and
sending, via the antenna array configured in the new antenna configuration, the new downlink beams towards the network edge, wherein the beam index scanner operating at the network edge scans the new downlink beams to determine new beam index scanner data for the new antenna configuration of the antenna array, and wherein the new beam index scanner data indicates that a new downlink channel provided by the new downlink beams is optimized.

3. The antenna system of claim 2, wherein the antenna configuration comprises an azimuth value and a tilt value associated with a position of the antenna array.

4. The antenna system of claim 3, wherein the new antenna configuration comprises a new azimuth value and a new tilt value associated with a new position of the antenna array.

5. The antenna system of claim 1, wherein the antenna array, the processor, and the memory are part of an eNodeB.

6. The antenna system of claim 1, wherein the antenna array, the processor, and the memory are part of a gNodeB.

7. The antenna system of claim 1, wherein the antenna array, the processor, and the memory are part of a combined eNodeB and gNodeB.

8. A method comprising:
generating, by an antenna system comprising a processor executing antenna software, downlink beams directed towards a network edge;
sending, by the antenna system, the downlink beams towards the network edge, wherein a beam index scanner operating at the network edge scans the downlink beams to determine beam index scanner data for an antenna configuration of an antenna array, and wherein the beam index scanner data indicates that a downlink channel provided by the downlink beams is not optimized;
receiving, by the antenna system, from an antenna technician device, a request for a new antenna configuration to optimize the downlink channel; and
configuring the antenna array in the new antenna configuration to optimize the downlink channel.

9. The method of claim 8, further comprising:
generating, by the antenna system, new downlink beams directed towards the network edge; and
sending, by the antenna system, via the antenna array configured in the new antenna configuration, the new downlink beams towards the network edge, wherein the beam index scanner operating at the network edge scans the new downlink beams to determine new beam index scanner data for the new antenna configuration of the antenna array, and wherein the new beam index scanner data indicates that a new downlink channel provided by the new downlink beams is optimized.

10. The method of claim 8, wherein the antenna configuration comprises an azimuth value and a tilt value associated with a position of the antenna array.

11. The method of claim 8, wherein the new antenna configuration comprises a new azimuth value and a new tilt value associated with a new position of the antenna array.

12. The method of claim 8, wherein the antenna system is part of an eNodeB.

13. The method of claim 8, wherein the antenna system is part of a gNodeB.

14. The method of claim 8, wherein the antenna system is part of a combined eNodeB and gNodeB.

15. A computer-readable storage medium comprising computer-executable instructions that, when executed by a processor of an antenna system, cause the processor to perform operations comprising:
generating downlink beams directed towards a network edge;
sending the downlink beams towards the network edge, wherein a beam index scanner operating at the network edge scans the downlink beams to determine beam index scanner data for an antenna configuration of an antenna array, and wherein the beam index scanner data indicates that a downlink channel provided by the downlink beams is not optimized;
receiving, from an antenna technician device, a request for a new antenna configuration to optimize the downlink channel; and
configuring the antenna array in the new antenna configuration to optimize the downlink channel.

16. The computer-readable storage medium of claim 15, wherein the operations further comprise:
generating new downlink beams directed towards the network edge; and
sending, via the antenna array configured in the new antenna configuration, the new downlink beams towards the network edge, wherein the beam index scanner operating at the network edge scans the new downlink beams to determine new beam index scanner data for the new antenna configuration of the antenna array, and wherein the new beam index scanner data indicates that a new downlink channel provided by the new downlink beams is optimized.

17. The computer-readable storage medium of claim 15, wherein the antenna configuration comprises an azimuth value and a tilt value associated with a position of the antenna array.

18. The computer-readable storage medium of claim 15, wherein the new antenna configuration comprises a new azimuth value and a new tilt value associated with a new position of the antenna array.

19. The computer-readable storage medium of claim 15, wherein the antenna system is part of an eNodeB.

20. The computer-readable storage medium of claim 15, wherein the antenna system is part of a gNodeB.

\* \* \* \* \*